US012608760B2

(12) United States Patent
Wang et al.

(10) Patent No.: US 12,608,760 B2
(45) Date of Patent: Apr. 21, 2026

(54) METHOD AND SYSTEM OF AUTOMATIC CONTENT-DEPENDENT IMAGE PROCESSING ALGORITHM SELECTION

(71) Applicant: Intel Corporation, Santa Clara, CA (US)

(72) Inventors: Chen Wang, San Jose, CA (US); Huan Dou, Bejiing (CN); Sang-Hee Lee, San Jose, CA (US); Yi-Jen Chiu, San Jose, CA (US); Lidong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 18/281,947

(22) PCT Filed: Jun. 16, 2021

(86) PCT No.: PCT/CN2021/100315
§ 371 (c)(1),
(2) Date: Sep. 13, 2023

(87) PCT Pub. No.: WO2022/261849
PCT Pub. Date: Dec. 22, 2022

(65) Prior Publication Data
US 2024/0153033 A1    May 9, 2024

(51) Int. Cl.
| | |
|---|---|
| *G06T 3/4053* | (2024.01) |
| *G06T 3/4046* | (2024.01) |
| *G06T 7/11* | (2017.01) |
| *G06T 7/40* | (2017.01) |
| *G06V 10/82* | (2022.01) |
| *G06V 20/40* | (2022.01) |

(52) U.S. Cl.
CPC .......... *G06T 3/4053* (2013.01); *G06T 3/4046* (2013.01); *G06T 7/11* (2017.01); *G06T 7/40* (2013.01); *G06T 2207/10016* (2013.01); *G06T 2207/20084* (2013.01); *G06V 10/82* (2022.01); *G06V 20/49* (2022.01)

(58) Field of Classification Search
None
See application file for complete search history.

(56) References Cited

U.S. PATENT DOCUMENTS

| | | | |
|---|---|---|---|
| 2018/0338159 A1 | 11/2018 | Kapoor et al. | |
| 2020/0043135 A1* | 2/2020 | Chou ........................ | G06T 1/20 |

(Continued)

FOREIGN PATENT DOCUMENTS

| | | | | |
|---|---|---|---|---|
| CN | 104778659 | 7/2015 | | |
| CN | 105844589 B | * 12/2018 | .......... | G06T 3/4053 |
| CN | 110580680 A | * 12/2019 | .......... | G06T 3/4053 |

(Continued)

OTHER PUBLICATIONS

Sun et al; "Super Resolution Reconstruction of Images Based on Interpolation and Full Convolutional Neural Network and Application in Medical Fields"; IEEE Access, vol. 7, pp. 186470-186479; Published Dec. 31, 2019. (Year: 2019).*

(Continued)

*Primary Examiner* — David Ometz
(74) *Attorney, Agent, or Firm* — Akona IP PC

(57) ABSTRACT
A method, system, and article is directed to automatic content-dependent image processing algorithm selection.

20 Claims, 11 Drawing Sheets

200

OBTAIN ONE OR MORE FRAMES OF A VIDEO SEQUENCE 202

DIVIDE THE INDIVIDUAL FRAMES INTO SECTIONS 204

DETERMINE WHETHER TO APPLY AT LEAST ONE NON-NEURAL NETWORK IMAGE PROCESSING ALGORITHM OR AT LEAST ONE NEURAL NETWORK IMAGE PROCESSING ALGORITHM TO THE INDIVIDUAL SECTIONS DEPENDING ON AT LEAST ONE CONTENT-BASED CRITERIUM 206

APPLY AT LEAST ONE DETERMINED ALGORITHM TO AT LEAST ONE OF THE SECTIONS TO PROCESS THE IMAGE DATA OF THE SECTIONS 208

(56)         References Cited

U.S. PATENT DOCUMENTS

2021/0082112 A1      3/2021  Li et al.
2021/0352307 A1 *  11/2021  Bae ...................... H04N 19/132

FOREIGN PATENT DOCUMENTS

| CN | 111402126 | 7/2020 | |
| CN | 111489292 | 8/2020 | |
| CN | 111800630 | 10/2020 | |
| CN | 112449140 | 3/2021 | |
| JP | 2020129276 A * | 8/2020 | .............. G06N 3/08 |
| KR | 20210045828 A * | 4/2021 | ............. G06V 10/82 |

OTHER PUBLICATIONS

Mishra et al; "A Hybrid Approach for Image Super-Resolution of Low Depth of Field Images"; 2015 International Conference on Signal Processing and Communication (ICSC); pp. 249-252; Published Mar. 2015 and added to IEEE Xplore on Jul. 9, 2015. (Year: 2015).*
International Search Report and Written Opinion for PCT Application No. PCT/CN2021/100315, dated Jan. 26, 2022.

* cited by examiner

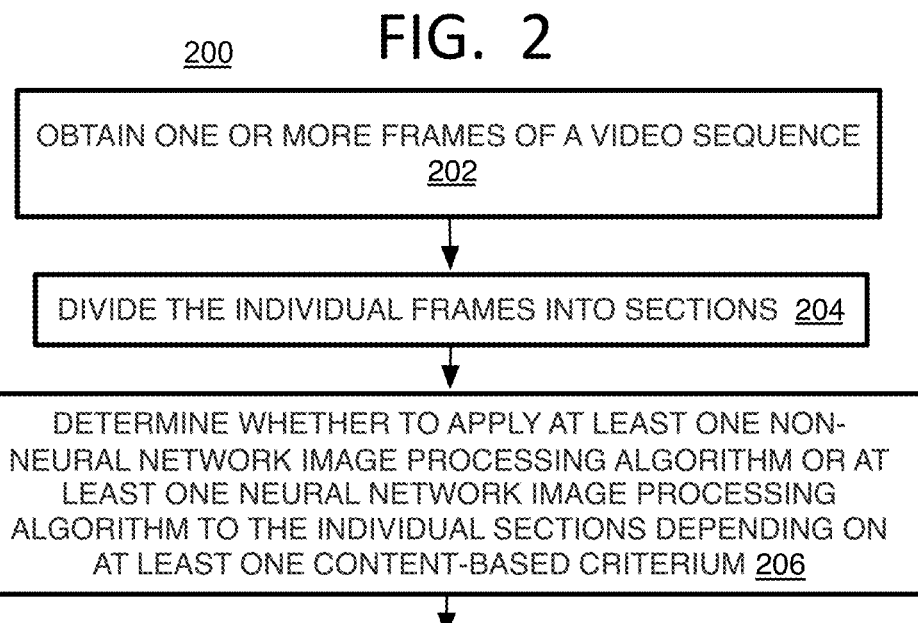

OBTAIN ONE OR MORE FRAMES OF A VIDEO SEQUENCE
202

DIVIDE THE INDIVIDUAL FRAMES INTO SECTIONS  204

DETERMINE WHETHER TO APPLY AT LEAST ONE NON-NEURAL NETWORK IMAGE PROCESSING ALGORITHM OR AT LEAST ONE NEURAL NETWORK IMAGE PROCESSING ALGORITHM TO THE INDIVIDUAL SECTIONS DEPENDING ON AT LEAST ONE CONTENT-BASED CRITERIUM 206

APPLY AT LEAST ONE DETERMINED ALGORITHM TO AT LEAST ONE OF THE SECTIONS TO PROCESS THE IMAGE DATA OF THE SECTIONS 208

300

OBTAIN VIDEO FRAMES OF IMAGE DATA 302

OBTAIN FIRST FRAME F = 1 304

C

DIVIDE FRAME INTO SECTIONS 306

OBTAIN FIRST SECTION S = 1 OF FRAME F 308

B

SET CONTENT-BASED THRESHOLD 318

PERFORM OBJECT SEGMENTATION 310

DETERMINE SECTION IMAGE DATA VALUE 320

PERFORM OBJECT RECOGNITION 312

COMPARE SECTION VALUE TO THRESHOLD 322

DETERMINE SALIENT SECTIONS 314

A

YES

CURRENT SECTION SALIENT? 316

NO

D

FIG. 4
400
FIG. 5
500
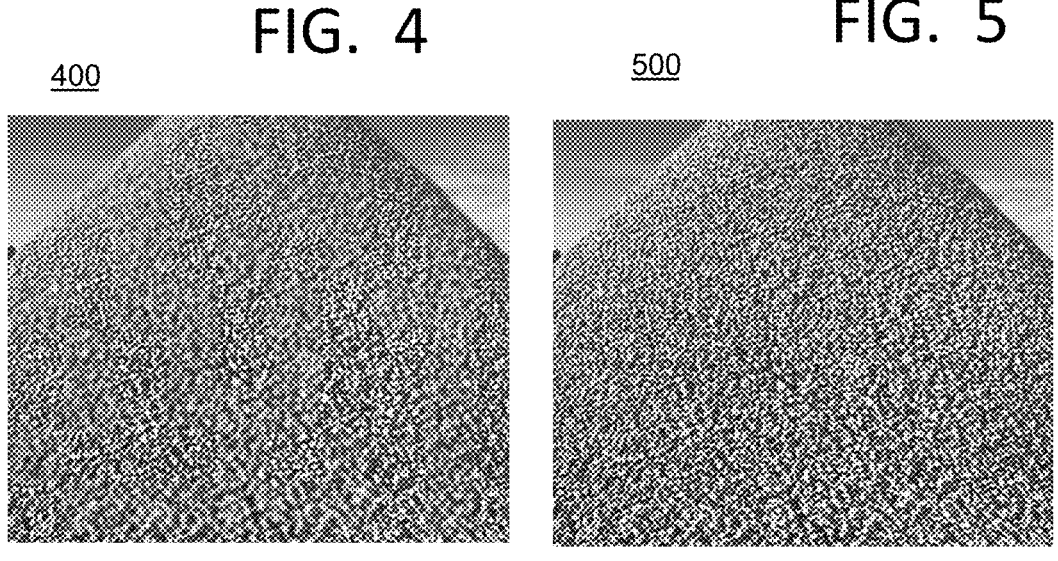
FIG. 6
600
FIG. 7
700
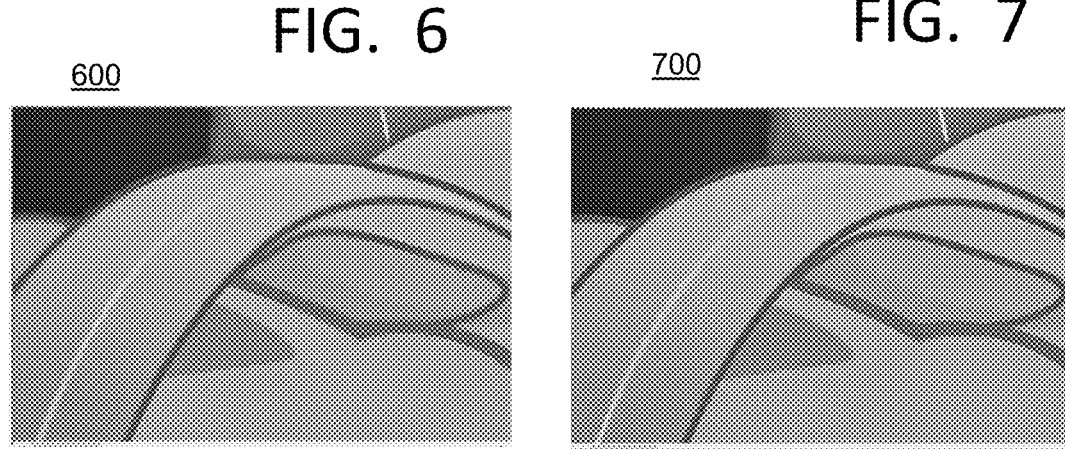

TABLE 1

| Index | Screenshot of the 1st Frame | Resolution | No. of Frames |
|-------|-----------------------------|------------|---------------|
| 1 | | 1920x1080 | 120 |
| 2 | | 1920x1080 | 120 |
| 3 | | 1920x1080 | 125 |
| 4 | | 1920x1080 | 120 |
| 5 | | 1920x1080 | 149 |
| 6 | | 1920x1080 | 120 |

| 7 | | 1920x1080 | 150 |
| 8 | | 1920x1080 | 149 |
| 9 | | 1920x1080 | 125 |
| 10 | | 1920x1080 | 149 |

900

1000

1100

IMAGING DEVICE(S) 1202

SENSOR COMPONENT 1206

CAMERA MODULE 1208

LOGIC UNITS/MODULES 1204

IMAGE INTAKE 1210

SR 1212

FRAME DIVIDER 1214

NON-NN SCALER 1218

VCAU 1216

DEEP LEARNING 1220

PROCESSOR CIRCUITRY 1222

ISP 1224

CPU 1226

CODER 1232

ANTENNA 1234

DISPLAY 1236

IMAGE 1238

MEMORY STORE(S) 1228

BUFFER 1230

IMAGE PROCESSING SYSTEM 1200

METHOD AND SYSTEM OF AUTOMATIC CONTENT-DEPENDENT IMAGE PROCESSING ALGORITHM SELECTION

CLAIM OF PRIORITY

This Application is a National Stage Entry of, and claims priority to, PCT Application No. PCT/CN2021/100315, filed on Jun. 16, 2021 and titled "METHOD AND SYSTEM OF AUTOMATIC CONTENT-DEPENDENT IMAGE PROCESSING ALGORITHM SELECTION," which is incorporated by reference in its entirety for all purposes.

BACKGROUND

Image processing algorithms are available to perform super-resolution (SR) imaging that is the upscaling of a lower resolution (LR) image to a higher resolution (HR) image, and is often performed to render videos of frame sequences in HR. The conventional real-time techniques, however, still provide relatively poor quality real-time super-resolution. High quality SR techniques are often neural network-based, however, and therefore very computationally heavy, and in turn, relatively slow, such that the known high quality network-based super-resolution techniques cannot be performed in real-time on small or edge devices with relatively small computational capacity and relatively small power capacity, such as on smart phones or tablets. A number of image processing techniques that use neural networks have similar difficulties such as for de-noising and image sharpening.

DESCRIPTION OF THE FIGURES

The material described herein is illustrated by way of example and not by way of limitation in the accompanying figures. For simplicity and clarity of illustration, elements illustrated in the figures are not necessarily to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a method of automatic content-dependent image processing algorithm selection in accordance with at least one of the implementations herein;

FIG. 4 is an image as a result of super-resolution with poor quality-performance balance;

FIG. 5 is an image as a result of super-resolution in accordance with at least one of the implementations herein;

FIG. 6 is an image as a result of super-resolution with poor quality-performance balance;

FIG. 7 is an image as a result of super-resolution in accordance with at least one of the implementations herein;

FIGS. 8A-8B is a table of snapshots of videos and video properties used for experimentation to test at least one of the implementations herein;

DETAILED DESCRIPTION

Figure 1:
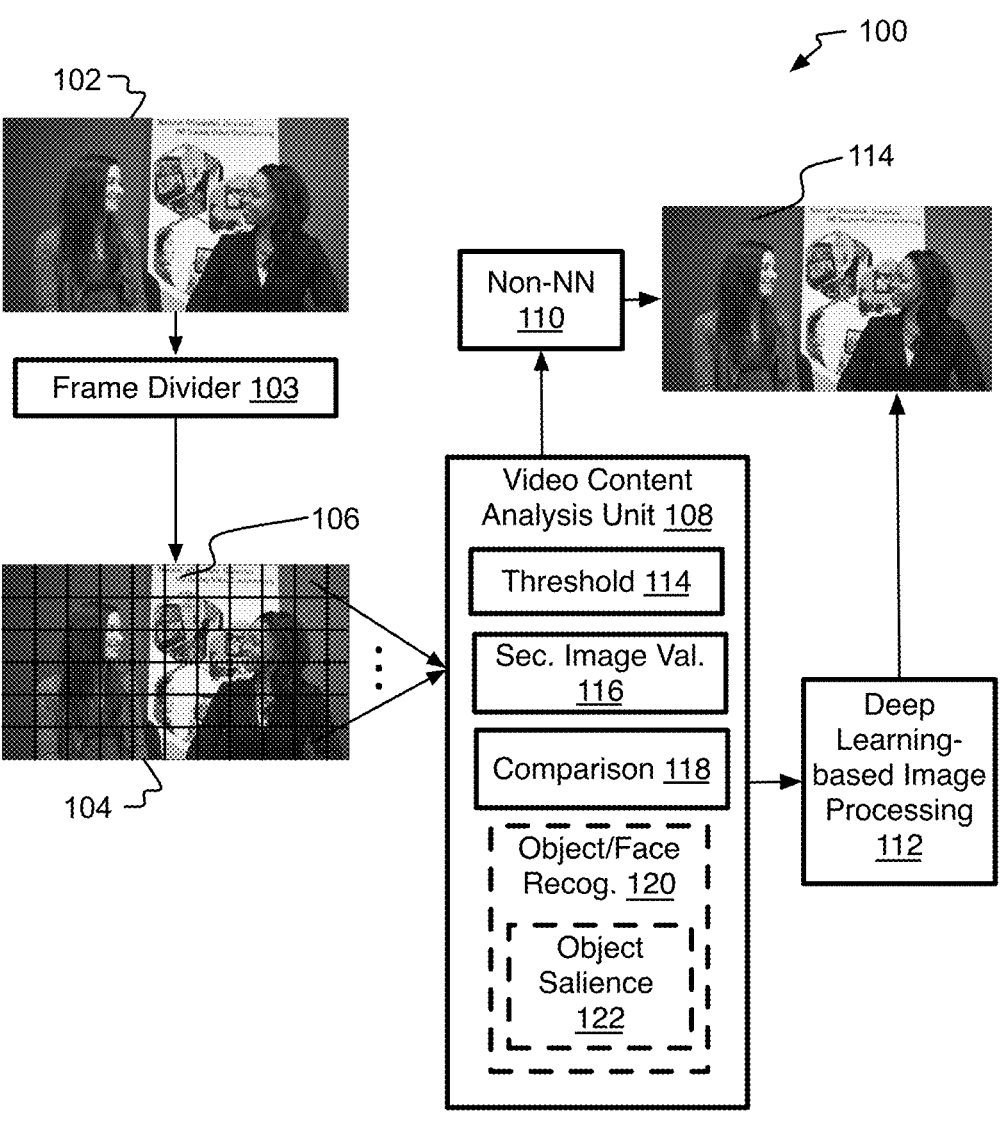
FIG. 1 is a schematic diagram of an image processing system according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, televisions, smart-monitors, smartphones, cameras, laptop computers, tablets, other edge type of devices such as internet-of-things (IoT) devices including kitchen or laundry appliances, camera security systems, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless stated otherwise. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic content-dependent image processing algorithm selection are described herein.

Older and more established default conventional image processing techniques such as super-resolution (SR) techniques may be referred to as non-neural network techniques and are often scaler-based direct techniques that typically apply interpolation of low resolution (LR) pixel data to generate high resolution (HR) pixel data, such as with bicubic interpolation. These techniques usually produce relatively low quality HR images.

Other more recent conventional high quality SR techniques are more sophisticated and use neural networks (or deep learning) to compute the HR image data. Deep learning-based video super-resolution often plays a vital role in various applications, such as video scaling, game rendering, and so on. However, the state-of-the-art deep learning-based methods often require significant computational loads, and in turn, large power capacity and memory bandwidth on the device performing the neural network image processing such as the SR. Thus, while conventional SR network techniques can provide good quality pictures in real-time, this can only occur on high-end computers. This requires specialized, large footprint graphics processing units, such as on desktops or servers. Such techniques cannot provide quality SR images on small mobile or edge devices, for example, that have resource-limited hardware platforms such as on laptops, tablets, and smart-phones. The integrated graphics hardware on such smaller platforms, when provided, are still too small to handle most SR neural networks adequately, if at all. Many SR neural network algorithms cannot achieve 60 or even 30 fps on small devices.

Known strategies exist, however, to attempt to accelerate the deep learning-based video super-resolution on the smaller devices. The most typical way is to simplify the neural network topology. This includes reducing the number of layers, channels, and/or connections between consecutive layers, as well as reducing the bit-precision for weights and activation functions of the network. Other techniques also try to use low rank approximation to reduce the complexity of the most computation-intensive layers such as convolutional layers and/or fully connected layers. Generally, rank approximation is finding the estimated column-by-row sizes of neural network layers or channels that are the most efficient. Finally, some networks (e.g., frame recurrent video super-resolution (FRVSR), or video restoration with enhanced deformable convolutional networks (EDVR)) also try to reduce the complexity of the neural network by seeking temporal correlations via another neural network, which predicts per-pixel motion vectors.

Although these neural network topology techniques may lower computation complexity, the neural network topology techniques sacrifice image quality when performing the video super-resolution. Neural networks still need to be sufficiently "deep" by maintaining at least some minimum amount of network layers, channels, and/or bit-precision to produce a noticeable quality improvement over traditional non-neural network methods, such as bicubic interpolation and/or Lanczos upscaling. This deepness requirement limits how much of the network complexity can be reduced. This same issue persists for the low rank approximation techniques as well. Finally, for the temporal-based neural networks mentioned above, such a system still needs to compute motion vectors between two frames, which adds another expensive, heavy computational neural network such that the computation savings on super-resolution computations is very limited. Note that the terms frame, image, and picture herein are used interchangeably.

To resolve these issues, the disclosed method and system use a light-weight video content analysis unit or circuit to adaptively select between (1) non-neural network (or scaler) algorithms, and (2) deep learning-based algorithms for image processing operations, such as super-resolution, depending on the content of the image. Specifically, the image or frame is divided into sections (also which may be referred to herein as patches, portions, parts, regions, or blocks). This is performed in order to provide a higher quality image by using the neural network algorithms on as much area of the image as possible when an image has varying image data complexity. A decision on whether to use neural network (NN) algorithms or non-neural network (non-NN) algorithms for each section is then made, and performed depending on the decision. By one form, the image data of each section is compared to a content (or smoothness or texture) threshold to make the selection between the non-NN scaler SR or the NN SR (or upscaling) algorithms.

More specifically, it has been observed that if a region on an image does not have sufficient texture information, applying complicated deep learning-based super-resolution will not provide noticeable quality improvement when compared with the conventional non-NN algorithms, such as with bicubic interpolation. Such lack of texture in a region (or section or patch) is widely encountered due to a number of different reasons. For example, the image patch simply may be smooth (or flat), such as with image content that is sky or a black chalk board for example where neural network processing does not necessarily add to the quality already present in such a section. Also, when an image patch has a large amount of content motion, at least some of the texture information is removed during image processing due to motion blur, making the image data of the patch appear to be smoother than it should be. By yet another example, an image patch may undergo severe compression, and for example, texture information may be lost during quantization by a video encoder, also resulting in image data in the patch that is smoother than was intended.

These observations provide an intuitive way to accelerate many different deep learning-based video super-resolution techniques depending on image content, and specifically the complexity or smoothness of the image data. The smoothness refers to the image data being flatter or more uniform. Thus, the system and method herein can decide to apply computation intensive deep learning-based approach at least when the image patches have sufficient texture information (or some minimum complexity) for the best visual quality improvement. By one optional form, image content saliency (or content importance to a person viewing the images, such as with human faces) also can be factored. Otherwise, when the image patches are smooth (or less complex), or optionally also when the image patches have content that is of no importance to a viewer, such as background of the image, the system and method can use a conventional non-NN or scaler technique for the upscaling to save compute and power without introducing noticeable quality degradation.

With this arrangement, the method herein significantly reduces unnecessary computational cost for the regions with limited texture where deep learning-based super-resolution has limited quality improvement over conventional non-NN algorithms but can consume about one hundred times more compute. Thus, performing the selection analysis and processing the image sections depending on the selection or decision can achieve the best performance acceleration of the neural network algorithms by using them when their impact is noticeable and with negligible quality impact. This results in significant quality improvement with much lower power consumption and acceleration of deep learning-based video super-resolution that can achieve faster frame rates with lower power consumption to enable such NN operation in real-time and on smaller devices.

Referring to FIG. 1, an image processing system or circuit 100 has a frame divider unit 103, a video content analysis unit or (circuit) 108, a non-NN circuit or unit 110, and a deep learning-based image processing circuit or unit 112. The system 100 receives images 102, and the frame divider unit 103 divides the images 102 to form a number of sections (or patches or regions) 106 on divided images 104. The video content analysis unit (VCAU) 108 then determines which algorithm (network or non-network-based) should be applied to a section for the image processing operation being performed, such as SR. Specifically, the VCAU 108 has a threshold unit 114 to obtain a content-related (or network or texture) threshold as one example criterium, or to pre-set the threshold when the threshold can be adjusted. The VCAU 108 also has a section image value unit 116 that determines a section representative value to be compared to the threshold to determine whether or not the section has sufficient content or texture that can benefit from the neural network algorithm. A comparison unit 118 performs the comparison and reaches the decision as to which algorithm to use.

By some options, the VCAU 108 also may have or be in communication with an object or face recognition unit 120 that itself has an object salience unit 122. These units 120 and 122 may perform object segmentation and object recognition in the images which may include facial recognition to find objects in the image that are sufficiently important to warrant using a NN algorithm on a section with an important object. This may be a preliminary operation to the decision between the non-NN and NN algorithms, and may determine whether or not the decision operation should be performed in the first place. It also will be appreciated that the object-related operations may be performed for other applications that require object recognition or facial recognition such as for security surveillance applications or virtual reality (VR) gaming for example, and so forth so that operation of the object-related processes may not add to the total computational load of the device in this case. Otherwise, the object related operations here may be omitted if the computational load would be too large and defeat the purpose of performing the decision operations.

Depending on the selection, the non-NN unit 110 performs the image processing, here being SR in this example, when the non-NN algorithm is selected. Otherwise, the deep learning-based image processing unit 112 performs the SR, or other image processing operation, when the selection is the NN algorithm. The processed sections or patches are then placed in the reconstructed image 114, here being an upscaled image. It should be noted that image processing operations other than SR could be performed as well such as de-noising and/or image sharpening to name a few examples. Other details are provided below with process 200 or 300 that explains operation of the system 100.

Referring to FIG. 2, an example process 200 for automatic content-dependent image processing algorithm selection described herein is arranged in accordance with at least some implementations of the present disclosure. In the illustrated implementation, process 200 may include one or more operations, functions or actions as illustrated by one or more of operations 202 to 208 numbered evenly. By way of non-limiting example, process 200 may be described herein with reference to any of the example image processing systems described herein and where relevant.

Process 200 may include "obtain one or more frames of a video sequence" 202, where the video frames or images may be obtained from a remote camera or the audio device itself may be a camera or multi-function device with a camera such as a smart-phone, tablet, or laptop, for example. This operation also may include any pre-processing of raw image data that is typically desired before performing enhancement or other image pre-processing operations such as super-resolution, de-noising, image sharpening, and other image processing.

Process 200 may include "divide the individual frames into sections" 204, where each frame may be divided into sections so that the algorithm decision or selection can be made section by section (or by groups of sections). By one example, the sections are a uniform 20×20 pixels or other rectangular shape, where the size may be selected to evenly fit within the pixel image dimensions of an image. By one alternative, the sections could have variable sizes and/or variable shapes in order to fit recognized objects for example. More details are provided below.

Process 200 may include "determine whether to apply at least one non-neural network image processing algorithm or at least one neural network image processing algorithm to the individual sections depending on at least one content-based criterium" 206. The criterium may be a threshold generated or obtained by the VCAU to provide a balance between (1) performance including computation time and power consumption and (2) image quality. By one form, the threshold is standard deviation of the image data of an individual section. By one form, the image data is just the luminance data (or Y data of a YUV color scheme). Other color schemes could be used as well, and color could be used in schemes that find color image data to be sufficiently reliable.

By this example then, a threshold is compared to a section representative value, such as the actual standard deviation of the image data of the section. If the image data of a section is found to be more complex or less smooth than the threshold setting, then sufficient texture is present so that the neural network algorithm should provide an adequate increase in image quality. If the actual representative value is below the standard deviation threshold, the section is too smooth to warrant the neural network algorithm and the non-NN algorithm is applied to the section instead.

By one form, the threshold may be adjustable to provide a seamless way for users to make trade-offs between the quality gain and performance boost according to their own usage scenarios without modifying the deep learning-based super-resolution (DLSR) network topology for example. Thus, the same AI-based solutions can be provided for various hardware platforms with different capabilities. The users here could be limited to application developers and device manufacturers, but by one alternative, end users being the buyer and user of the devices, also may be provided an interface to adjust the threshold such as a virtual sliding bar activator in setup applications for the image processing, for example.

By another option, the criterium may include the preliminary operations of performing object recognition which may include facial recognition. This may be performed to determine the salient objects in the images, and the algorithm decision process may only be applied to the sections with image data that is found to be sufficiently salient. This may include faces in video conferences where the background is not considered important enough to warrant the high quality neural network processing even though the background might pass the threshold test for use of the NN algorithm. The system may then merely apply the non-NN algorithm to the sections that are not salient to further increase performance.

Process 200 may include "apply at last one determined algorithm to at least one of the sections to process the image data of the sections" 208. Once a selection between non-NN and NN algorithm is made for a section, the corresponding selected image processing may be performed by using the selected algorithm, and the enhance or refined section may be added to the enhanced frame.

Figure 3A:
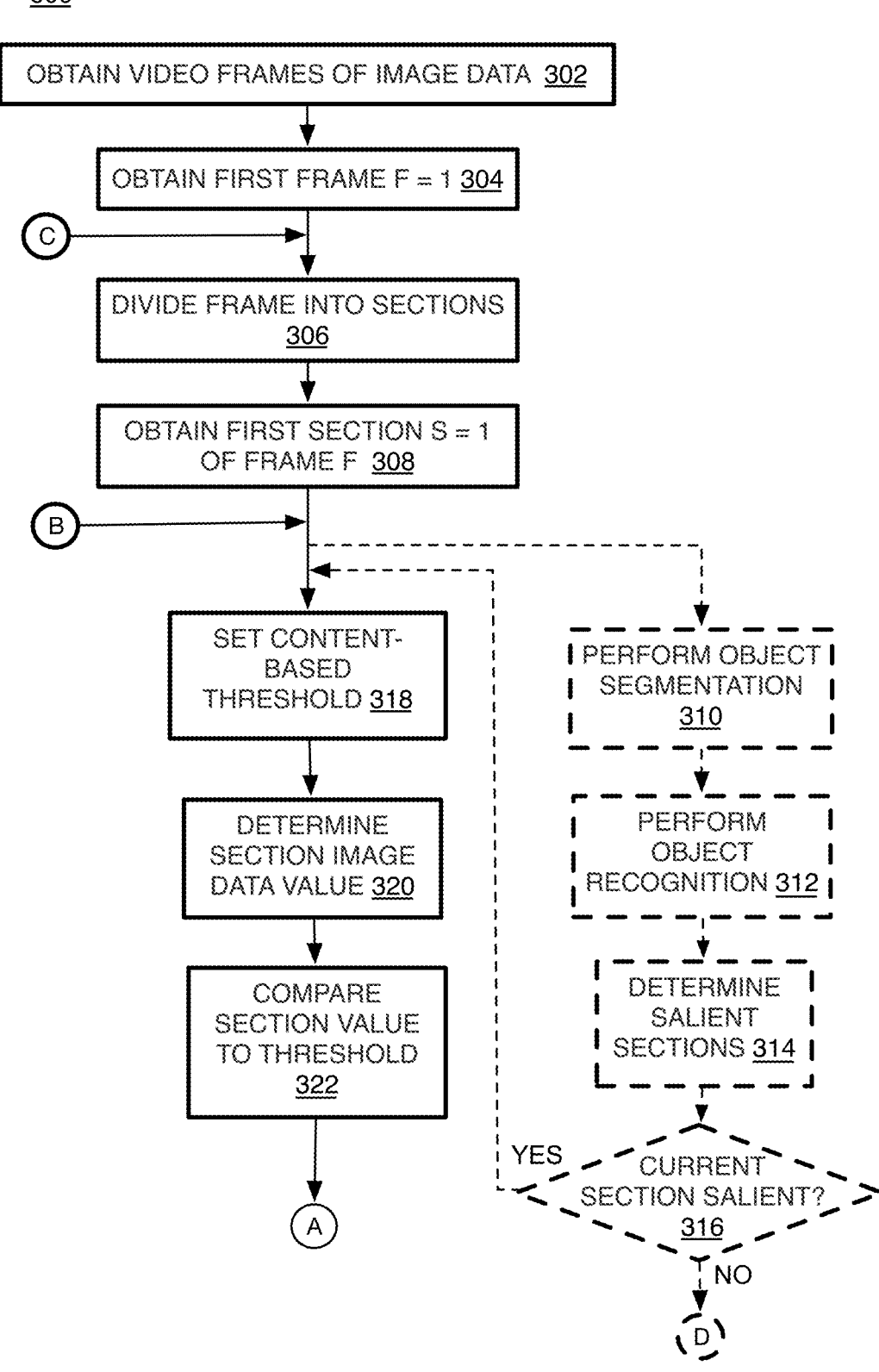
FIGS. 3A-3B is a flow chart of a method of automatic content-dependent image processing algorithm selection in accordance with at least one of the implementations herein.
Figure 3B:
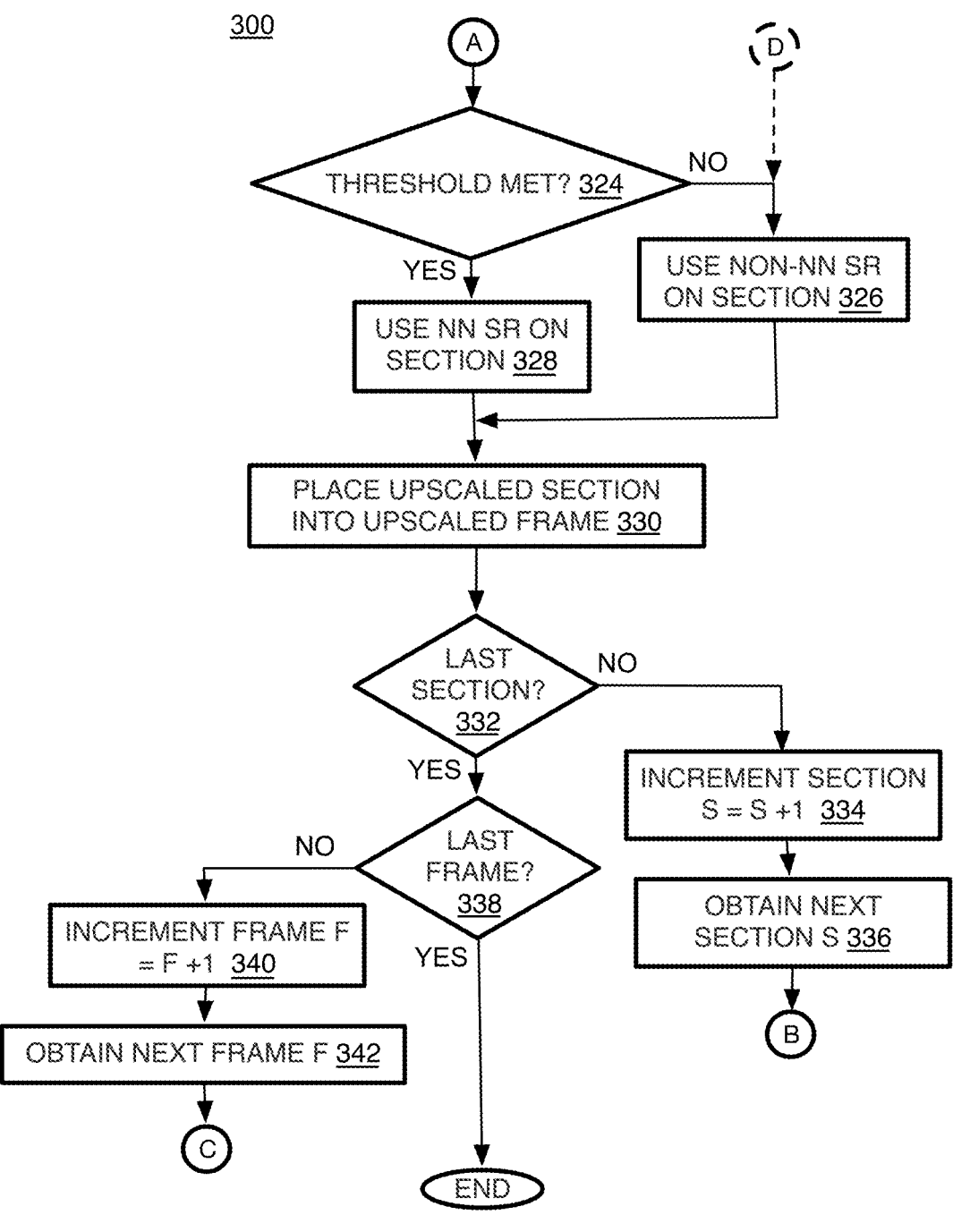

Referring to FIGS. 3A-3B, an example process 300 for automatic content-dependent image processing algorithm selection described herein is arranged in accordance with at least some implementations of the present disclosure. In the example process 300, the image processing operation is super-resolution. As understood, however, different image processing could be performed instead of, or in addition to, the SR, such as de-noising and/or image sharpening to name a few examples. Any image processing can be used here that could benefit by being more selective as to which sections of an image to apply a neural network algorithm. In the illustrated implementation, process 300 may include one or more operations, functions or actions as illustrated by one or more of operations 302 to 342 generally numbered evenly. By way of non-limiting example, process 200 may be described herein with reference to any of the example image processing systems described herein and where relevant.

Process 300 may include "obtain video frames of image data" 302, and this is already explained with operation 202 above.

Process 300 may include "obtain first frame F=1" 304, and for a video sequence being analyzed, this may be a first frame to be analyzed and is not necessarily the first frame in the video sequence. A count is created to track the frame analysis.

Process 300 may include "divide frame into sections" 306, where the individual frames of the input video frames being analyzed may be divided into m×n non-overlapped image patches, where by one example, m×n is 20×20 pixels although many other sizes may be used. The sections may have a uniform size throughout the frame or may vary. Alternatively, the sections also may vary in shape as well.

Process 300 may include "obtain first section S=1 of frame F" 308, where the sections are counted for tracking and the image data of the section S to be analyzed may be obtained from memory.

Optionally, as a preliminary operation of the criterium used to determine whether or not to apply the NN algorithm to a section, process 300 may perform an object-related option to determine whether the decision between the NN and non-NN algorithm should be made at all for a section.

Thus for this option, process 300 may include "perform object segmentation" 310, and this may be on the entire frame regardless of section boundaries. Alternatively, the segmentation, and object-related operations mentioned below could be done on a section by section basis. The object segmentation may be performed simply to divide the background of an image from the foreground of the image, or may be performed to identify the boundaries of a number of objects, and this may be performed by known techniques.

The object segmentation may be a preliminary step to "perform object recognition" 312. This could be a simple refining of the object segmentation shapes and identifying the objects by the shape, or could be a more sophisticated semantic segmentation that identifies the name of the object, and by one form, its properties by known semantic segmentation techniques. This operation also may include facial recognition that usually has image data with complex skin tones and is usually the most important part of an image to a user. Other target objects may be recognized as well.

Process 300 then may include "determine salient sections" 314, which first determines which are the important features of an image that would warrant the algorithm decision operations herein. As mentioned, this could be the foreground of an image or faces in a video conference call for example. Then, this operation includes determining whether the current section being analyzed is part of, or holds image data of, an important object. Thus, process 300 then may include the inquiry "current section salient?" 316. Here, if the section S being analyzed does not have image data of a salient object, then the process 300 continues at operation 326 to apply a non-NN SR operation, or other non-NN operation, such that the threshold based decision does not even need to be made. It will be appreciated, however, that the object-related option should be provided when the computational load and/or power consumption of the operations of the object-related option is relatively low so that a benefit of total better performance still is gained by using the object-related option here.

When the object-related option is not being provided, or when section S is found to have image data of a salient object, then process 300 may include "set content-based threshold" 318, also referred to as a texture, smoothness, or neural network threshold. The threshold is one of the criterium to determine whether or not to use the non-NN or NN algorithm, for the image processing operation such as super-resolution. Specifically, for an individual section (also referred to as a patch), the VCAU can decide which method (i.e., deep learning-based approach or non-NN (or scaler) approach) will be used. To keep the computation overhead of the VCAU or circuit is as light as possible, standard deviation of the image section's luminance channel is found to be an adequate discriminative feature. By applying this simple thresholding algorithm, the section S can be easily classified as having image data of either a texture (or complex) region or non-texture (smooth) region. By one example shown below, setting the threshold standard deviation to 10 has been found to be very successful.

The (VCAU) is very computation efficient and the threshold can vary to set different threshold values to cater to various usage scenarios. For example, to deploy an AI-based solution to some power-constraint platforms, such as a laptop, tablet and/or mobile phone, the threshold can be set higher to maximally boost the performance and reduce the power consumption as more sections will be processed by the non-NN solution with an acceptable quality impact. An example for setting the variable threshold is shown in Table 2 explained with the experiments below, where the threshold is tuned to maximally lower a GPU utilization when DLSR is applied. The threshold may be set to provide an acceptable quality impact where the disclosed method should show at least a visible quality improvement over bicubic interpolation, which is widely used in the industry as the default video scaling method, for example.

By one form, the disclosed algorithm decision method can provide an increase in performance by about four times over purely DLSR techniques. If the quality requirement is more stringent, however, the threshold can be lowered, but the performance improvement may be sacrificed as well. Thus, when the threshold is set to zero, the disclosed method only uses the NN technique with no quality drop at all but with no performance benefit.

With the adaptability (or adjustability) of the threshold, the disclosed algorithm decision method can provide a seamless way to make trade-offs between the quality gain and performance boost according to usage scenarios without modifying the deep learning-based super-resolution (DLSR) network topology for example. Thus, the same AI-based solutions disclosed here can be provided for various hardware platforms with different capabilities. While usually it may be that application developers and device manufactures that set the threshold, by one alternative, end users that buy and use the devices may be provided with an interface to adjust the threshold such as a virtual sliding bar activator in setup applications for the image processing, for example.

Process 300 may include "determine section image data value" 320, where the standard deviation of the image data in section S is determined, and by one form mentioned, based on the luminance data. This value may be referred to as the section representative value. Other values could be used instead as long as the value may be compared to the threshold to determine smoothness (or complexity or texture) of the image data of the section, such as gradient, histogram distribution, and a cumulative distribution functions (CDFs).

Process 300 may include "compare section value to threshold" 322, where the threshold is compared to the section representative value. By this example then, the threshold is compared to a section representative value, such as the actual standard deviation of the image data of the section. If the image data of a section is found to be more complex or less smooth than the threshold setting, then sufficient texture is present so that the neural network algorithm should provide an adequate increase in image quality. If the actual representative value is below the standard deviation threshold or other such threshold, the section is too smooth to warrant the neural network algorithm and the non-NN algorithm is applied to the section instead.

By one efficiency alternative, the process 300 could determine the section representative value of all sections in a frame first. Those sections with the same representative value (or something very close such as within 1 or 2) can then be grouped together. In this case, the comparison is only performed once for the representative value (or here standard deviation) of the group rather than making the decision between algorithms section by section.

Process 300 may include "threshold met?" 324, and if not, process 300 may include "use non-NN SR on section" 326. This may be a scaler computation such as with bicubic interpolation, Lanczos computation, or others such as Intel Advance Video Sampler (AVS), nearest-neighbor interpolation, bilinear interpolation, edge-directed interpolation, etc. By one example, the non-SR algorithm may be performing 2× upscaling here to a non-texture region.

Otherwise, if the threshold is met, process 300 may include "use NN SR on section" 328 to apply the deep learning-based approach. By one form, the neural network technique may be EDSR3 with 3 residual blocks and 20 channels of feature maps by one example. Again, the deep learning-based approach may be applied only to texture regions (or texture sections S) thereby effectively accelerating the deep learning-based approach so that real-time NN algorithm-based SR can be achieved on small devices.

Process 300 next may include "place upscaled section into upscaled frame" 330, where the sections are collected in a desired order and arranged to form an entire frame of image data.

After processing section S, process 300 may include the inquiry "last section?" 332, and if not the last section of a frame, process 300 may include "increment section S=S+1" 334, "obtain next section S" 336, and loop back to operation 318 (or 310 if object recognition is being used) to begin processing for the next section S.

Otherwise, if the last section of a frame was reached, then process 300 may include the inquiry "last frame?" 338, and if not, process 300 may include "increment frame F=F+1" 340, "obtain next frame F" 342, and loop back to operation 306 to begin operations on a next frame. If so, the image processing here improved by the algorithm decision method ends, and subsequent image processing techniques can then be applied to the enhanced or refined output image, whether it is further pre-processing operations for later image processing such as for display, storing, or encoding of the images, for example.

As mentioned, while the process 300 is explained with super-resolution image processing, other image pre-processing operations or subsequent image processing operations could be used here as well. Thus, for de-noising the decision may be between non-NN de-noising such as DCT, BM3D and NN de-noising such as ARCNN, VDSR, DnCNN Likewise, non-NN image sharpening techniques include USM, bilateral filter and Intel Image Enhancement Filter (IEF) and an NN image sharpening technique includes any CNN-based deblurring method. Similarly, object detection techniques may adopt non-NN feature extraction methods that may include SIFT, HOG and Haar-like features, while the NN object detection technique includes R-CNN, FPN, R-FCN to extract candidate regions.

The disclosed algorithm decision method has fairly good accuracy to distinguish complex image sections (or sections with texture) from sections that are smooth (no or little texture), high motion, or erroneous or distorted image data due to severe compression. In this case, lower quality images may result when the non-NN algorithm applies to too many complex sections.

On the other hand, the algorithm decision method maintains a relatively low computation complexity and is compatible with hardware acceleration. The disclosed algorithm decision method also is compatible with many other state-of-the-art performance optimizing techniques, such as network topology simplification and low rank approximation, for example, which both can be used with the presently disclosed method to achieve even better performance.

This can be accomplished by maintaining the VCAU itself as simple as possible to avoid introduction of extra computations which may deteriorate the overall performance. However, as computation complexity is reduced and better performance is prioritized, it is much more difficult to find a suitable algorithm with sufficient accuracy to still provide acceptable high image quality.

Thus, when the decision algorithm is not sufficiently accurate, noticeable artifacts will be observed which significantly degrades the visual quality. An example is shown in FIGS. 4-7 which shows an example of subjective quality comparisons between a previously studied VCAU algorithm with less accuracy than the disclosed algorithm decision method. The previous VCAU used random selection instead of determining standard deviation of luma data in the currently disclosed method. Random selection may be the easiest and fastest way to assign an image section to the non-NN algorithm or the NN algorithm. Besides its negligible computation costs, the end user could intuitively control the system's computation complexity by adjusting the probability of the selection. However, the selection decided by this method may not always lead to the best visual quality of the super-resolution. In other words, random selection tends to assign incorrect processing methods to the image sections. On the contrary, determining standard deviation of luma data does a much better job with minimal increase of computation cost and visual quality drop.

In this example, an image 400 is a result of the previously studied VCAU algorithm with less accuracy, while an image 500 (FIG. 5) of the same content of image 400 shows the results of the disclosed algorithm decision method with better quality. Likewise, and referring to FIG. 6, an image 600 is a result of the previously studied VCAU algorithm with less accuracy, while an image 700 (FIG. 7) of the same content of image 600 shows the results of the disclosed algorithm decision method with better quality. Thus, as mentioned for images 400 and 600 above, using a more inaccurate VCAU algorithm that would either lead to noticeable visual artifacts, as shown on the figures, or worse such as reduced run-time performance.

EXPERIMENTATION

Experiments were performed to verify the disclosed method by applying DLSR on Intel® Tiger Lake/Alder Lake (TGL/ADL) platforms. A 20×20 image patch was used and the texture threshold was set at 10. The deep learning-based approach was the EDSR3 network technique with three residual blocks and 20 channels of feature maps. The non-network scaler technique was bicubic interpolation. The image process was super-resolution performing 2× upscaling, where each video tested was downscaled 2× to generate 540p input video from original 1080p video used as ground-truth.

Referring to FIG. 8A-8B, an evaluation of video clips 1 to 10 represented by snapshots of the video clips shown in Table 1 was conducted. Table 1 shows the index number of the video along with the resolution and number of frames in the video tested. The test was performed to determine: (1) how much performance acceleration the present algorithm decision method could achieve, which can be estimated by the percentage of image patches classified as non-texture regions, and (2) how much quality impact results when compared with the conventional deep learning-based video super-resolution. This was verified by comparing both an objective video quality metric, such as video multi-method assessment fusion (VMAF), and a subjective video quality metric of image generated with the disclosed method to images generated by using the conventional techniques.

The results of the comparisons for objective video quality are provided below on Table 2 in the form of VMAF scores comparing the disclosed method to an entirely NN method and an entirely non-NN method as recited below. The higher the VMAF score, the higher the quality of the image, and where differences in VMAF less than 1.0 can be considered negligible.

TABLE 2

| Index | Neural Network (EDSR3) | Disclosed Method | Non-NN (Bicubic interp.) |
|---|---|---|---|
| 1 | 97.8517 | 96.6885 | 88.5985 |
| 2 | 100 | 100 | 92.517 |
| 3 | 99.8835 | 99.2552 | 93.1417 |
| 4 | 99.9853 | 99.8994 | 93.1726 |
| 5 | 100 | 100 | 93.9341 |
| 6 | 100 | 99.9193 | 97.2052 |
| 7 | 86.5333 | 86.3461 | 72.3522 |
| 8 | 99.0537 | 96.5094 | 91.0783 |
| 9 | 100 | 99.9953 | 96.4819 |
| 10 | 99.1323 | 99.0584 | 87.6531 |
| Average | 98.24398 | 97.76716 | 90.61346 |

As indicated in Table 2, when compared with an EDSR3 neural network technique, most of the test clips (i.e., eight out of the ten) have negligible quality differences (i.e., less than 0.7 (VMAF) score drop). A noticeable VMAF drop (i.e., around 1.2 and 2.5 VMAF score drop (from video 1 and 8, respectively) from the NN algorithm to the disclosed decision algorithm method was observed on two of the test clips. However, when the disclosed decision algorithm method is compared to the bicubic interpolation, the visual quality improvement is still very significant (i.e., around 8.0 and 5.4 VMAF score increase for videos 1 and 8, respectively).

As to the theoretical performance improvement balanced with the quality impact of the disclosed algorithm decision method, a Table 3 shows the increase in performance and VMAF objective quality measures as follows.

TABLE 3

| Index | Non-texture region Percentage | Theoretical Speedup X | VMAF Loss Over EDSR3 | VMAF Gain Over Bicubic |
|---|---|---|---|---|
| 1 | 84.26% | 6.35 | 1.1632 | 8.09 |
| 2 | 34.44% | 1.53 | 0 | 7.483 |
| 3 | 77.43% | 4.43 | 0.6283 | 6.1135 |
| 4 | 68.84% | 3.21 | 0.0859 | 6.7268 |
| 5 | 36.45% | 1.57 | 0 | 6.0659 |
| 6 | 78.60% | 4.67 | 0.0807 | 2.7141 |
| 7 | 63.12% | 2.71 | 0.1872 | 13.9939 |
| 8 | 90.72% | 10.78 | 2.5443 | 5.4311 |
| 9 | 36.85% | 1.58 | 0.0047 | 3.5134 |
| 10 | 79.18% | 4.80 | 0.0739 | 11.4053 |
| Average | 64.99% | 4.16 | 0.47682 | 7.1537 |

It should be noted that in this evaluation, VMAF instead of PSNR is selected as the objective video quality metric because the VMAF results are considered to be much more aligned with human subjective evaluation. From Table 2 and 3 above, the disclosed algorithm decision method can potentially provide enormous performance savings (i.e., around an average of 4×), while maintaining minimal or unnoticeable quality impact (i.e., less than about an average of 0.5 VMAF score drop).

Figure 9:
FIG. 9 is an image as a result of conventional super-resolution using a neural network technique.
Figure 10:
FIG. 10 is an image as a result of conventional super-resolution using a non-neural network technique.
Figure 11:
FIG. 11 is an image as a result of super-resolution in accordance with at least one of the implementations herein.

Referring to FIGS. 9-11, an example of subjective quality evaluation of the disclosed algorithm decision method is shown on the video 5 (on Table 1). The disclosed algorithm decision method has the better subjective quality as well. Specifically, an image 900 is the result of using a NN algorithm such as EDSR3 output. An image 1000 is the result of using a non-NN algorithm which was bicubic interpolation output. An image 1100 is the result of applying the disclosed algorithm decision method.

No visible quality difference is observed between the original EDSR3 (image 900) and the disclosed method (image 1100). However, the disclosed method has significant quality improvement when compared with the bicubic interpolation image (1000) with much sharper output.

In addition, any one or more of the operations of the processes in FIGS. 2-3B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein may comprise, for example, singly or in any combination, hardwired circuitry, programmable circuitry such as computer processors formed by processor circuitry and comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 12:
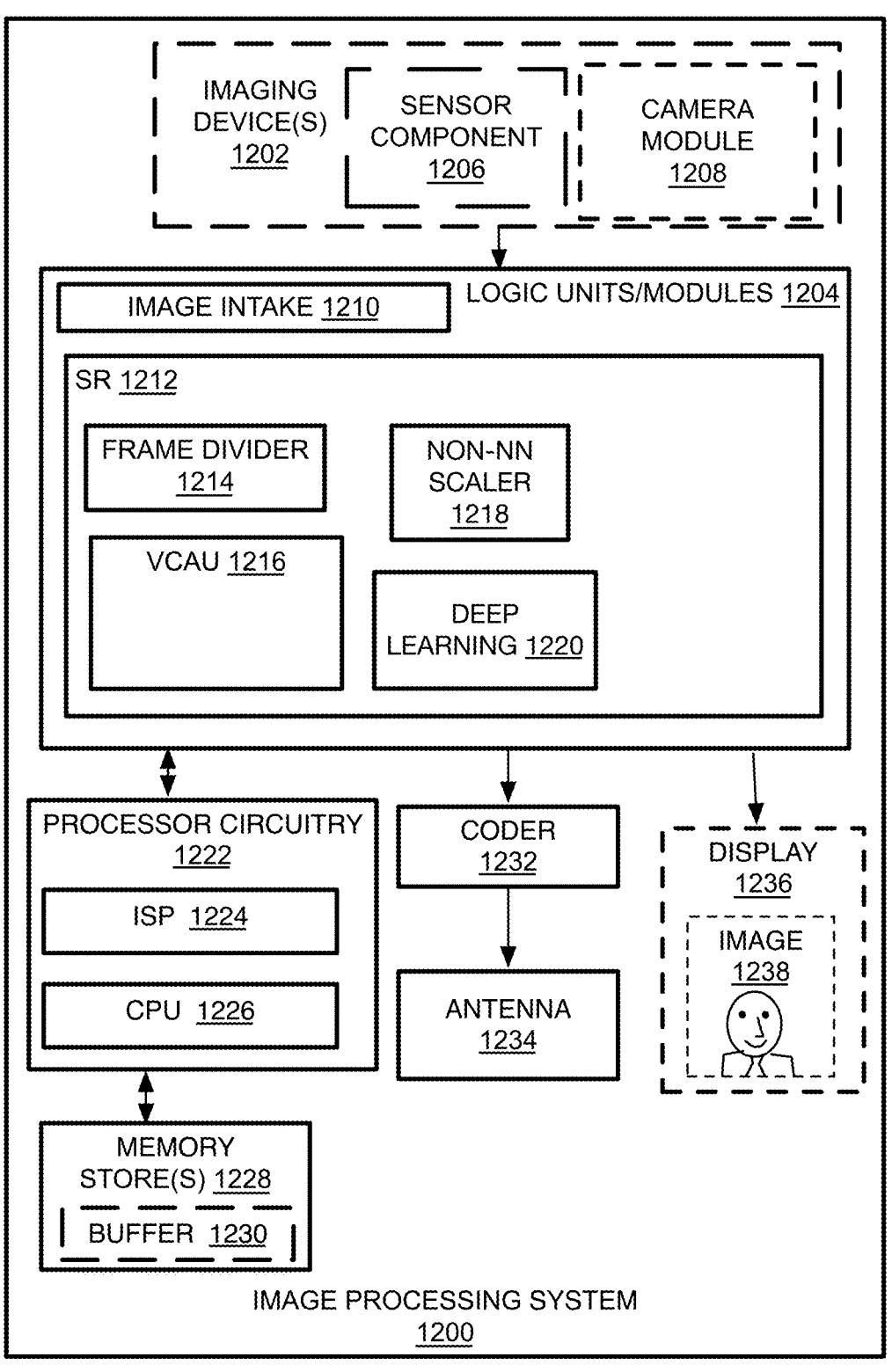
FIG. 12 is an illustrative diagram of an example image processing system

Referring to FIG. 12, an example image processing system 1200 is arranged in accordance with at least some implementations of the present disclosure. In various implementations, the example image processing system 1200 may have an imaging device 1202 to form or receive captured image data. This can be implemented in various ways. Thus, in one form, the image processing system 1200 may be a digital camera or other image capture device, and imaging device 1202, in this case, may be the camera hardware and camera sensor software, module, or component 1208. In other examples, imaging processing system 1200 may have an imaging device 1202 that includes, or may be a camera, and logic modules (or units or circuits) 1204 may communicate remotely with, or otherwise may be communicatively coupled to, the imaging device 1202 for further processing of the image data.

In either case, such technology may include a camera such as a digital camera system, a dedicated camera device, or an imaging phone, whether a still picture or video camera or some combination of both. Thus, in one form, imaging device 1202 may include camera hardware and optics including one or more sensors as well as auto-focus, zoom, aperture, ND-filter, auto-exposure, flash, and actuator controls. These controls may be part of a sensor module or component 1206 for operating the sensor. The sensor component 1206 may be part of the imaging device 1202, or may be part of the logical modules 1204 or both. Such sensor component can be used to generate images for a viewfinder and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types as long as a multi-frame statistics gathering window can be used. In other examples, an RGB-Depth camera and/or microphone-array might be used in addition to or in the alternative to a camera sensor. In some examples, imaging device 1202 may be provided with an eye tracking camera. Also, it will be understood that device 1200 may not have a camera and retrieves images from a memory, whether or not transmitted from another device.

In the illustrated example, the logic modules 1204 may include an image intake unit 1210 that pre-processes raw data or obtains images from memory so that the images are ready for SR or other image processing operations that can be used with the algorithm decision methods described herein. For one example here, an SR unit 1212 may include a frame divider 1214, a VCAU 1216, a non-NN scaler unit 1218, and a deep learning unit 1220 as described above with system 100. These units or modules (or circuits) perform tasks as suggested by the label of the unit or module and as already described above with units or modules with similar or same labels. The units or modules (or circuits) may perform additional tasks than that described herein.

The logic modules 1204 may be communicatively coupled to the imaging device 1202 in order to receive raw image data when provided, but is otherwise in communication with memory store(s) 1228 to retrieve images. The memory store(s) 1228 may have buffers 1230 or other external or internal memory formed of RAM such as DRAM, cache, or many other types of memory to hold frames of a video sequence being analyzed or other data.

The image processing system 1200 may have processor circuitry 1222 forming one or more processors. This may include one or more CPUs 1226 such as the Intel® Atom, and one or more dedicated image signal processors (ISPs) 1224. The processor circuitry 1222 may include any graphics accelerator, GPU, and so forth. The system 1200 also may have one or more displays 1236, coder 1232, and antenna 1234. It will be understood that at least parts of the units, components, or modules mentioned may be considered to be at least partly formed or on at least one of the processors formed by processor circuitry 1222, such as any of the NNs being at least partly formed by the ISP 1224 or GPU.

In one example implementation, the image processing system 1200 may have the display 1236, at least one processor 1222 communicatively coupled to the display, at least one memory 1228 communicatively coupled to the processor and having the buffer 1230 by one example for storing initial images, algorithm selection data, and processed image data including upscaled images when SR is the image processing being performed.

The coder 1232 and antenna 1234 may be provided to compress or decompress image data for transmission to or from other devices that may display or store the images. It will be understood that the image processing system 1200 also may include a decoder (or coder 1232 may include a decoder) to receive and decode image data for processing by the system 1200. Otherwise, the processed image 1238 may be displayed on display 1236 or stored in memory 1228. As illustrated, any of these components may be capable of communication with one another and/or communication with portions of logic modules or circuits 1204 and/or imaging device 1202. Thus, processors 1222 may be communicatively coupled to both the image device 1202 and the logic modules 1204 for operating those components. By one approach, although image processing system 1200, as shown in FIG. 12, may include one particular set of units or actions associated with particular components, modules, or circuits, these units or actions may be associated with different components, modules, or circuits than the particular component, module, or circuit illustrated here.

Figure 13:
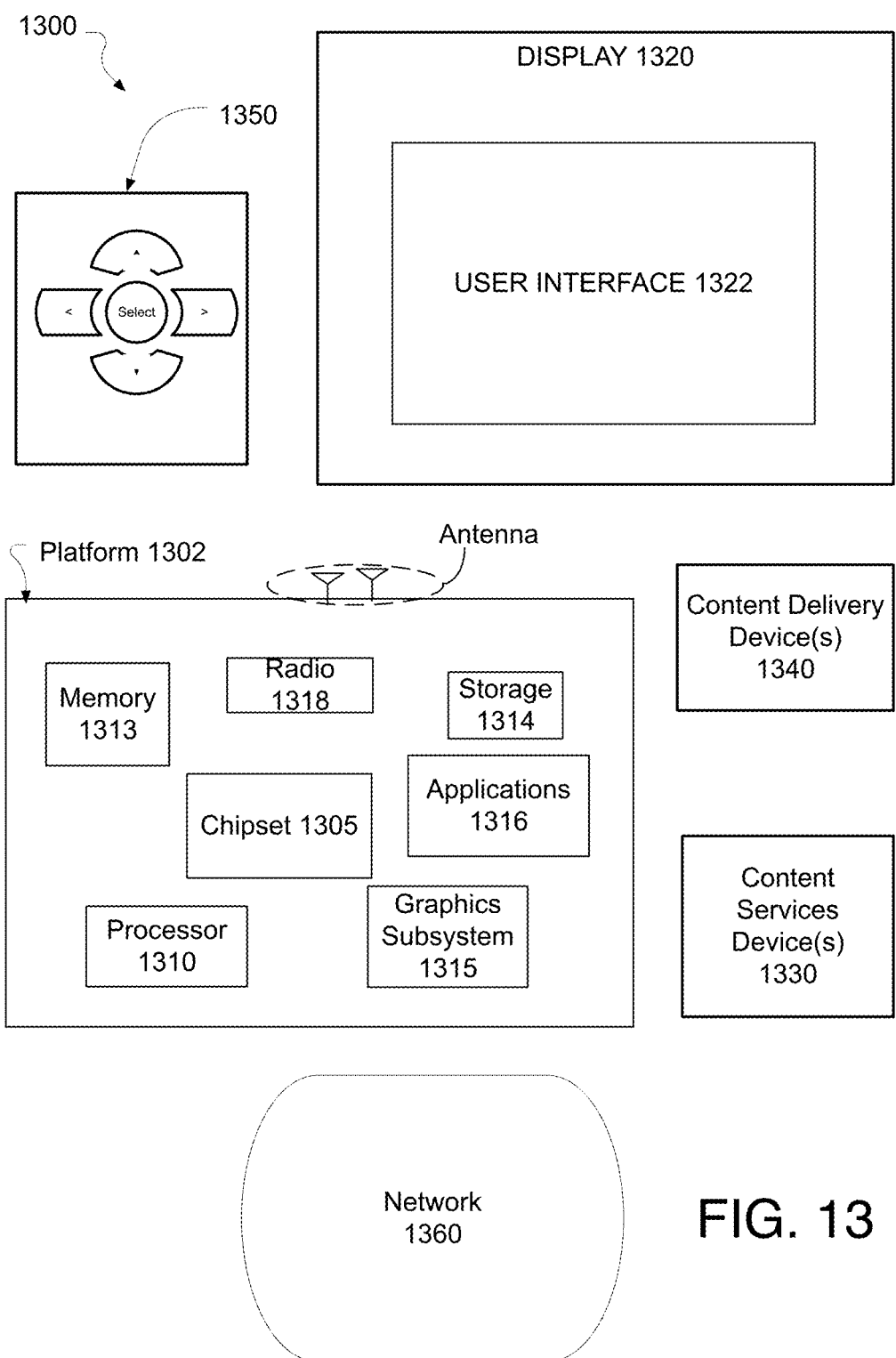
FIG. 13 is an illustrative diagram of an example system.

Referring to FIG. 13, an example system 1300 in accordance with the present disclosure operates one or more aspects of the image processing system described herein. It will be understood from the nature of the system components described below that such components may be associated with, or used to operate, certain part or parts of the image processing system described above. In various implementations, system 1300 may be a media system although system 1300 is not limited to this context. For example, system 1300 may be incorporated into a digital still camera, digital video camera, or other mobile device with camera or video functions. Otherwise, system 1300 may be any device whether it has a camera or not, such as a mobile small device or an edge device. System 1300 may be any of an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), any Internet of Things (IoT) device, mobile internet device (MID), messaging device, data communication device, and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1313, storage 1314, graphics subsystem 1315, applications 1316, and/or radio 1318. Chipset 1305 may provide intercommunication among processor 1310, memory 1313, storage 1314, graphics subsystem 1315, applications 1316 and/or radio 1318. For example, chipset 1305 may include a storage adapter (not depicted) capable of providing inter-communication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1313 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU), image signal processor (ISP), or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
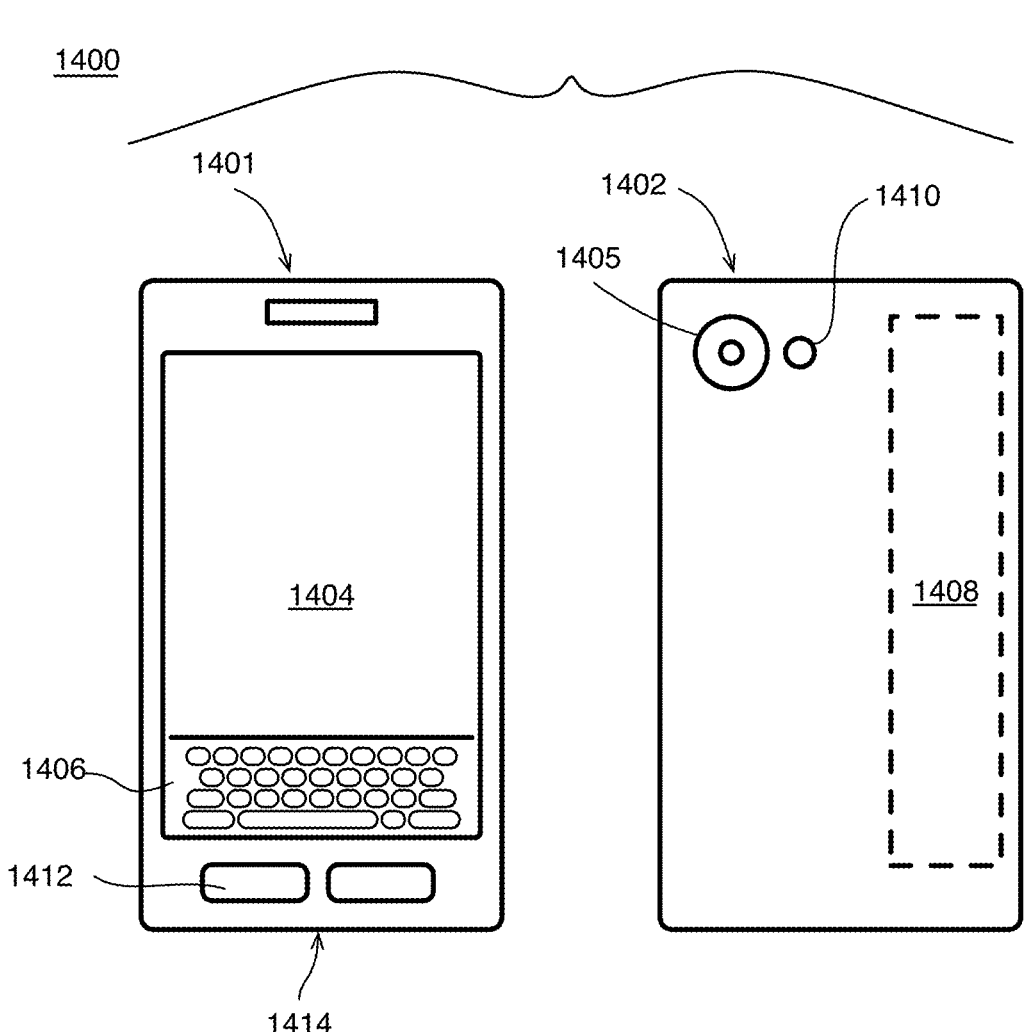
FIG. 14 is an illustrative diagram of an example system, all arranged in accordance with at least some implementations of the present disclosure.

Referring to FIG. 14, a small form factor device 1400 is one example of the varying physical styles or form factors in which systems 1200 or 1300 may be embodied. By this approach, device 1400 may be implemented as a small or edge mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone 1414, or may be digitized by a voice recognition device. As shown, device 1400 may include a camera 1405 (e.g., including at least one lens, aperture, and imaging sensor) and a flash 1410 integrated into back 1402 (or elsewhere) of device 1400. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of image processing, comprises obtaining one or more frames of a video sequence; dividing the individual frames into sections; automatically determining whether to apply at least one non-neural network image processing algorithm or at least one neural network image processing algorithm to the individual sections depending on at least one content-based criterium; and applying at least one determined algorithm to at least one of the sections to process the image data of the sections.

By an example second implementation, and in furtherance of the first implementation, wherein the image processing comprises performing super-resolution to upscale the one or more frames.

By an example third implementation, and in furtherance of the first or second implementation, wherein the criterium is a texture-based threshold.

By an example fourth implementation, and in furtherance of any one of the first to third second implementation, wherein the criterium includes a texture-based threshold of smoothness of the image data of the individual sections.

By an example fifth implementation, and in furtherance of any one of the first to third second implementation, wherein the criterium includes a texture-based threshold of smoothness of the image data of the individual sections, and wherein the threshold is a limit of a standard deviation of the image data of the individual sections.

By an example sixth implementation, and in furtherance of any one of the first to fifth implementation, wherein the criterium is only based on luminance data of the sections.

By an example seventh implementation, and in furtherance of any one of the first to sixth implementation, wherein the sections have uniform sizes on a single frame.

By an example eighth implementation, and in furtherance of any one of the first to sixth implementation, wherein the sections have different sizes on a single frame.

By an example ninth implementation, and in furtherance of any one of the first to sixth implementation, wherein the sections are all rectangular to form a grid of rows and columns of uniform sized sections.

By an example tenth implementation, and in furtherance of any one of the first to ninth implementation, wherein at least some of the sections are 20×20 pixels.

By an example eleventh implementation, a system for image processing, comprises memory to at least store image data of frames of a video sequence; and processor circuitry being communicatively coupled to the memory and being arranged to operate by: obtaining one or more frames of a video sequence; dividing the individual frames into sections; automatically determining whether to apply at least one non-neural network image processing algorithm or at least one neural network image processing algorithm to the individual sections depending on at least one content-based criterium; and applying at least one determined algorithm to the sections to process the image data of the sections.

By an example twelfth implementation, and in furtherance of the eleventh implementation, wherein the image processing comprises performing at least one of: super-resolution, image de-noising, and image sharpening.

By an example thirteenth implementation, and in furtherance of the eleventh or twelfth implementation, wherein the criterium includes a texture-based threshold of smoothness of the image data of the individual sections.

By an example fourteenth implementation, and in furtherance of any one of the eleventh to thirteenth implementation, wherein the threshold is a limit of a standard deviation of the image data of the individual sections.

By an example fifteenth implementation, and in furtherance of any one of the eleventh to fourteenth implementation, wherein the threshold is adjustable to balance performance in computation time and power capacity versus image quality.

By an example sixteenth implementation, at least one non-transitory article having at least one computer readable medium comprises a plurality of instructions that in response to being executed on a computing device, cause the computing device to operate by: obtaining one or more frames of a video sequence; dividing the individual frames into sections; automatically determining whether to apply at least one non-neural network image processing algorithm or at least one neural network image processing algorithm to the individual sections depending on at least one content-based criterium; and applying at least one determined algorithm to the sections to process the image data of the sections.

By an example seventeenth implementation, and further to the sixteenth implementation, wherein the image processing comprises performing super-resolution to upscale the one or more frames.

By an example eighteenth implementation, and further to the sixteenth or seventeenth implementation, wherein the criterium includes a texture-based threshold that is a measure of smoothness of the image data of the individual sections.

By an example nineteenth implementation, and further to the sixteenth or seventeenth implementation, wherein the criterium includes a texture-based threshold that is a measure of smoothness of the image data of the individual sections, and wherein the measure is a limit to a standard deviation of the image data of the individual sections.

By an example twentieth implementation, and further to any one of the sixteenth to nineteenth implementation, wherein the criterium includes a texture-based threshold that is a measure of smoothness of the image data of the individual sections wherein the sections have uniform sizes on a single frame regardless of the content on the single frame.

By an example twenty-first implementation, and further to any one of the sixteenth to twentieth implementation, wherein the sections of a single frame have a variety of shapes or sizes or both.

By an example twenty-second implementation, and further to any one of the sixteenth to twenty-first implementation, wherein the at least one content-based criterium is a variable threshold that can be varied to balance performance including computation time and power consumption versus image quality.

By an example twenty-third implementation, and further to any one of the sixteenth to twenty-first implementation, wherein the at least one content-based criterium is a variable threshold that can be varied to balance performance including computation time and power consumption versus image quality, and wherein the at least one content-based criterium factors object segmentation, and the instructions cause the computing device to apply the at least one non-neural network image processing algorithm only to a background of the image.

By an example twenty-fourth implementation, and further to any one of the sixteenth to twenty-first implementation, wherein the at least one content-based criterium is a variable threshold that can be varied to balance performance including computation time and power consumption versus image quality, and wherein the at least one content-based criterium factors object segmentation, and the instructions cause the computing device to apply the at least one non-neural network image processing algorithm only to a background of the image, and wherein the at least one content-based criterium factors object recognition, and the instructions cause the computing device to perform the determining only on sections with recognized objects deemed to be important to a viewer of the video sequence.

By an example twenty-fifth implementation, and further to any one of the sixteenth to twenty-first implementation, wherein the at least one content-based criterium is a variable threshold that can be varied to balance performance including computation time and power consumption versus image quality, and wherein the at least one criterium factors facial recognition.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
   obtaining one or more frames of a video sequence;
   dividing a frame of the one or more frames into one or more sections;
   selecting between a non-neural network image processing algorithm and a neural network image processing algorithm to apply to a section of the one or more sections, wherein selecting comprises:
      determining whether the section is a salient section;
      based on the section being a non-salient section, selecting the non-neural network image processing algorithm;

based on the section being a salient section, determining whether a standard deviation of the section's luminance channel meets a criterion;
      based on the standard deviation meeting the criterion, selecting the neural network image processing algorithm; and
      based on the standard deviation not meeting the criterion, selecting the non-neural network image processing algorithm; and
   applying the selected algorithm to the section.

2. The computer-implemented method of claim 1, wherein the non-neural network image processing algorithm and the neural network image processing algorithm comprises performing super-resolution to upscale the section.

3. The computer-implemented method of claim 1, wherein the criterion is a texture-based threshold.

4. The computer-implemented method of claim 1, wherein the criterion includes a texture-based threshold of smoothness of the section.

5. The computer-implemented method of claim 4, wherein the threshold is a limit of the standard deviation of the section's luminance channel.

6. The computer-implemented method of claim 1, wherein the criterion is only based on the section's luminance channel.

7. The computer-implemented method of claim 1, wherein the one or more sections have different sizes on a single frame.

8. A system for image processing, comprising:
   memory to at least store image data of frames of a video sequence; and
   processor circuitry being communicatively coupled to the memory and being arranged to operate by:
      obtaining one or more frames of a video sequence;
      dividing a frame of the one or more frames into one or more sections;
      selecting between a non-neural network image processing algorithm and a neural network image processing algorithm to apply to a section of the one or more sections, wherein selecting comprises:
         determining whether the section is a salient section;
         based on the section being a non-salient section, selecting the non-neural network image processing algorithm;
         based on the section being a salient section, determining whether a standard deviation of the section's luminance channel meets a criterion;
         based on the standard deviation meeting the criterion, selecting the neural network image processing algorithm; and
         based on the standard deviation not meeting the criterion, selecting the non-neural network image processing algorithm; and
      applying the selected algorithm to the section.

9. The system of claim 8, wherein the non-neural network image processing algorithm and the neural network image processing algorithm comprises performing super-resolution to upscale the section.

10. The system of claim 8, wherein the criterion includes a texture-based threshold of smoothness of the section.

11. The system of claim 10, wherein the texture-based threshold is a limit of the standard deviation of the section's luminance channel.

12. The system of claim 10, wherein the texture-based threshold is adjustable to balance performance in computation time and power capacity versus image quality.

13. At least one non-transitory article having at least one computer readable medium comprising a plurality of instructions that in response to being executed on a computing device, cause the computing device to operate by:

obtaining one or more frames of a video sequence;

dividing a frame of the one or more frames into one or more sections;

selecting between a non-neural network image processing algorithm and a neural network image processing algorithm to apply to a section of the one or more sections, wherein selecting comprises:

determining whether the section is a salient section;

based on the section being a non-salient section, selecting the non-neural network image processing algorithm;

based on the section being a salient section, determining whether a standard deviation of the section's luminance channel meets a criterion;

based on the standard deviation meeting the criterion, selecting the neural network image processing algorithm; and based on the standard deviation not meeting the criterion, selecting the non-neural network image processing algorithm; and applying the selected algorithm to the section.

14. The at least one non-transitory article of claim 13, wherein the non-neural network image processing algorithm and the neural network image processing algorithm comprises performing super-resolution to upscale the section.

15. The at least one non-transitory article of claim 13, wherein the criterion includes a texture-based threshold that is a measure of smoothness of the section.

16. The at least one non-transitory article of claim 15, wherein the measure is a limit to the standard deviation of the section's luminance channel.

17. The at least one non-transitory article of claim 13, wherein the one or more sections have uniform sizes on a single frame.

18. The at least one non-transitory article of claim 13, wherein the criterion is a variable threshold that varied to balance performance including computation time and power consumption versus image quality.

19. The at least one non-transitory article of claim 18, wherein the section is determined to be the non-salient section based on the section being part of a background of the frame.

20. The at least one non-transitory article of claim 18, wherein the section is determined to be the salient section based on the section having a recognized object deemed to be important to a viewer of the video sequence.

* * * * *